Figure 1:
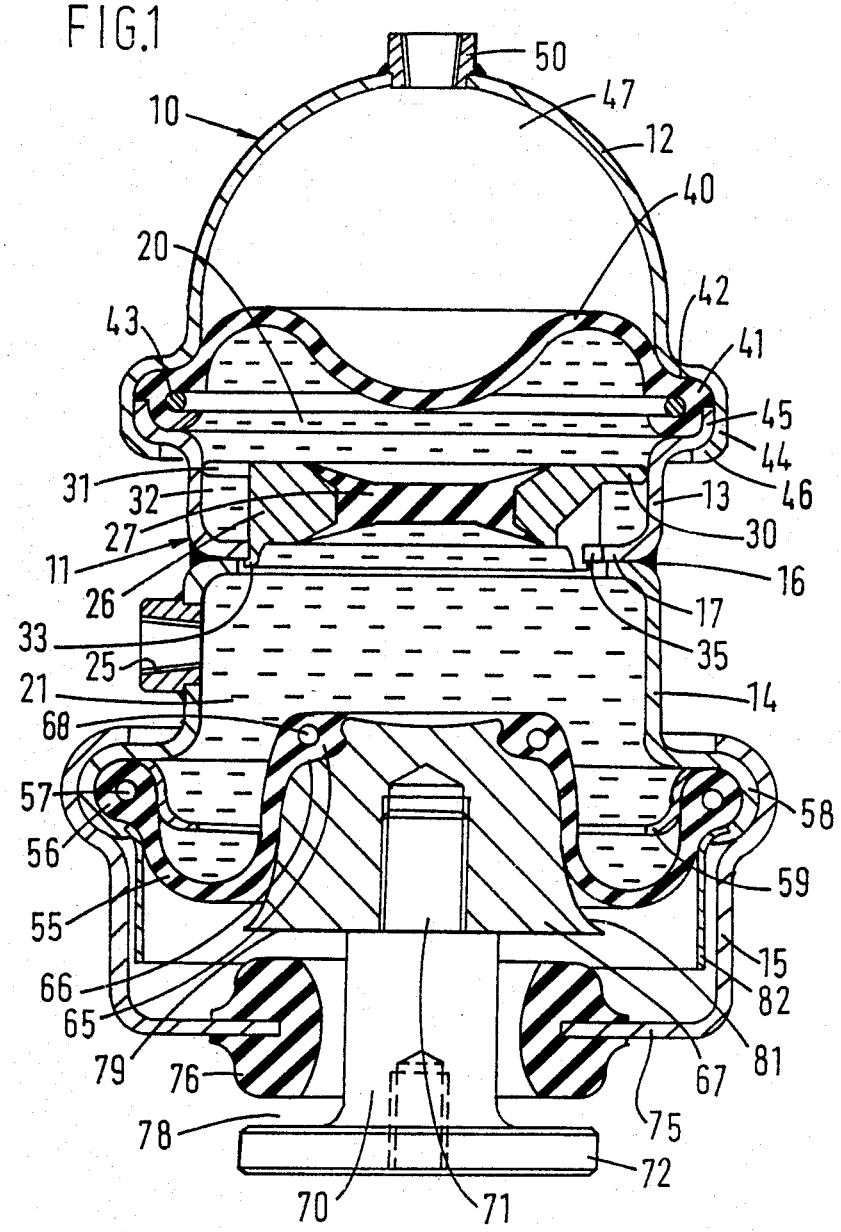

United States Patent [19]

Clark

[11] Patent Number: 4,682,753
[45] Date of Patent: Jul. 28, 1987

[54] VIBRATION ABSORBING MOUNTINGS

[75] Inventor: Michael Clark, Coventry, England

[73] Assignee: Dunlop Limited, United Kingdom

[21] Appl. No.: 665,945

[22] Filed: Oct. 29, 1984

[30] Foreign Application Priority Data

Nov. 12, 1983 [GB] United Kingdom ................. 8330254
Aug. 3, 1984 [GB] United Kingdom ................. 8419910

[51] Int. Cl.$^4$ ............................................. F16F 13/00
[52] U.S. Cl. .................................. 248/562; 248/631; 248/636
[58] Field of Search ............... 248/562, 659, 636, 638, 248/631; 267/140.1, 113

[56] References Cited

U.S. PATENT DOCUMENTS

| | | | |
|---|---|---|---|
| 598,982 | 2/1898 | Egger | 267/64.27 X |
| 3,137,466 | 6/1964 | Rasmussen | 248/562 |
| 3,173,671 | 3/1965 | Broadwell . | |
| 3,658,314 | 4/1972 | Luzsicza | 248/562 |
| 3,669,400 | 6/1972 | Lowe | 248/631 |
| 3,874,646 | 4/1975 | Vernier | 267/140.1 |
| 3,958,654 | 5/1976 | LeSalver et al. . | |
| 4,108,416 | 8/1978 | Nagase | 248/631 |
| 4,161,304 | 7/1979 | Brenner | 267/140.1 |
| 4,199,128 | 4/1980 | Vandenboom | 267/140.1 |
| 4,378,936 | 4/1983 | Brenner | 267/140.1 |
| 4,401,298 | 8/1983 | Eaton | 267/140.1 |
| 4,458,888 | 7/1984 | Wolf | 267/140.1 |
| 4,511,126 | 4/1985 | Bernucmon | 267/140.1 |
| 4,516,545 | 5/1985 | Kumagal | 248/636 |

FOREIGN PATENT DOCUMENTS

| | | | |
|---|---|---|---|
| 0014742 | 9/1980 | European Pat. Off. . | |
| 42910 | 3/1981 | European Pat. Off. | 248/562 |
| 0027751 | 4/1981 | European Pat. Off. | 267/140.1 |
| 0050446 | 4/1982 | European Pat. Off. . | |
| 0058408 | 8/1982 | European Pat. Off. . | |
| 0065298 | 11/1982 | European Pat. Off. . | |
| 0072262 | 2/1983 | European Pat. Off. . | |
| 115417 | 8/1984 | European Pat. Off. | 267/140.1 |
| 3239787 | 10/1982 | Fed. Rep. of Germany . | |
| 3310911 | 9/1984 | Fed. Rep. of Germany | 267/140.1 |
| 2274833 | 2/1976 | France | 267/140.1 |
| 0575960 | 4/1958 | Italy | 267/140.1 |
| 0811748 | 4/1959 | United Kingdom . | |
| 1341383 | 12/1973 | United Kingdom . | |
| 2041488 | 9/1979 | United Kingdom . | |
| 2041485 | 9/1980 | United Kingdom | 267/64.23 |
| 1581935 | 12/1980 | United Kingdom . | |
| 1583964 | 2/1981 | United Kingdom . | |
| 1583963 | 2/1981 | United Kingdom . | |
| 1602291 | 11/1981 | United Kingdom . | |
| 2087511 | 5/1982 | United Kingdom . | |
| 2132311 | 7/1984 | United Kingdom | 267/140.1 |
| 2137727 | 10/1984 | United Kingdom | 267/140.1 |

Primary Examiner—Reinaldo P. Machado
Assistant Examiner—Alvin Chin-Shue
Attorney, Agent, or Firm—Stevens, Davis, Miller & Mosher

[57] ABSTRACT

A vibration absorbing mounting for a vehicle engine incorporates hydraulic damping by means of a pair of liquid filled chambers (20,21) which are separated by a thick rubber intermediate diaphragm and communicate via a restricted passageway (32). A gas spring acts on one chamber and a piston (67) sealed by a reinforced rolling-lobe diaphragm (55) acts on the other chamber, the reinforcement of the rolling-lobe diaphragm providing low rolling resistance while maintaining high bulge stiffness.

6 Claims, 2 Drawing Figures

VIBRATION ABSORBING MOUNTINGS

This invention relates to vibration absorbing mountings, and particularly, but not exclusively, to engine mountings for motor vehicles.

The engine of a motor car is normally mounted on vehicle chassis members by mounting devices which incorporate blocks or rings of rubber bonded to metal end members which are fastened respectively to the engine and to the chassis members. In order to improve the performance of such mountings it has been proposed to provide hydraulic damping by incorporating liquid-filled chambers within the rubber blocks, the chambers being arranged to communicate through relatively restricted passages so as to damp the transmission of vibrations from the engine to the chassis via the rubber mountings.

While hydraulically damped mounting devices of the above kind provide a high degree of isolation of the chassis from vibrations arising in the engine, their performance can still be improved, and the present invention is directed to the provision of mountings by which such further improvement may be effected.

According to the invention, a vibration absorbing mounting comprises a reinforced elastomeric rolling-lobe end diaphragm sealed to a housing and a piston engaging the central region of the end diaphragm, the housing comprising a pair of liquid-filled chambers which communicate with one another through a restricted passageway and which are separated from one another by an intermediate elastomeric diaphragm of sufficient thickness to provide substantial spring stiffness, a first chamber of said liquid-filled chambers being adjacent the end diaphragm, and a second of said liquid-filled chambers being bounded at one side by the said intermediate elastomeric diaphragm and at the other side by a separator diaphragm, the housing also comprising a gas chamber for containing gaseous pressure arranged to act on the side of the separator diaphragm remote from the second liquid-filled chamber.

The term "reinforced elastomeric diaphragm" as used in the preceding paragraph means a diaphragm which is made from rubber or other suitable elastomeric material having a relatively inextensible reinforcement such as a conventional cord reinforcement, or which is made from a material of inherently high Young's modulus. The effect of providing a reinforced end diaphragm is to ensure that while the rolling lobe does not provide substantial resistance to linear movement of the associated piston it is stiff in the sense of resisting bulging of the rolling lobe under pressure.

In order to connect the piston to an engine or a chassis member it is provided with a stem extending axially from the housing, and the stem may be provided with a flange to enable it to be so secured. In a preferred embodiment of the invention, the housing extends around the piston and stem and supports an annular elastomeric buffer ring in an annular gap between the piston and the flange, thus providing bump and rebound overload protection for the mounting.

The gas chamber may comprise a fixed mass of gas, i.e. it may be a permanently sealed unit, but in order to obtain required characteristics the mass of gas in the chamber may be varied under the control of suitable apparatus, and in one example it may be connected to a reservoir through a valve which may be wholly or partially closed in order to reduce the effective volume of the chamber. Such control may be dependent upon engine speed, the valve being closed when a predetermined speed is reached.

Figure 2:
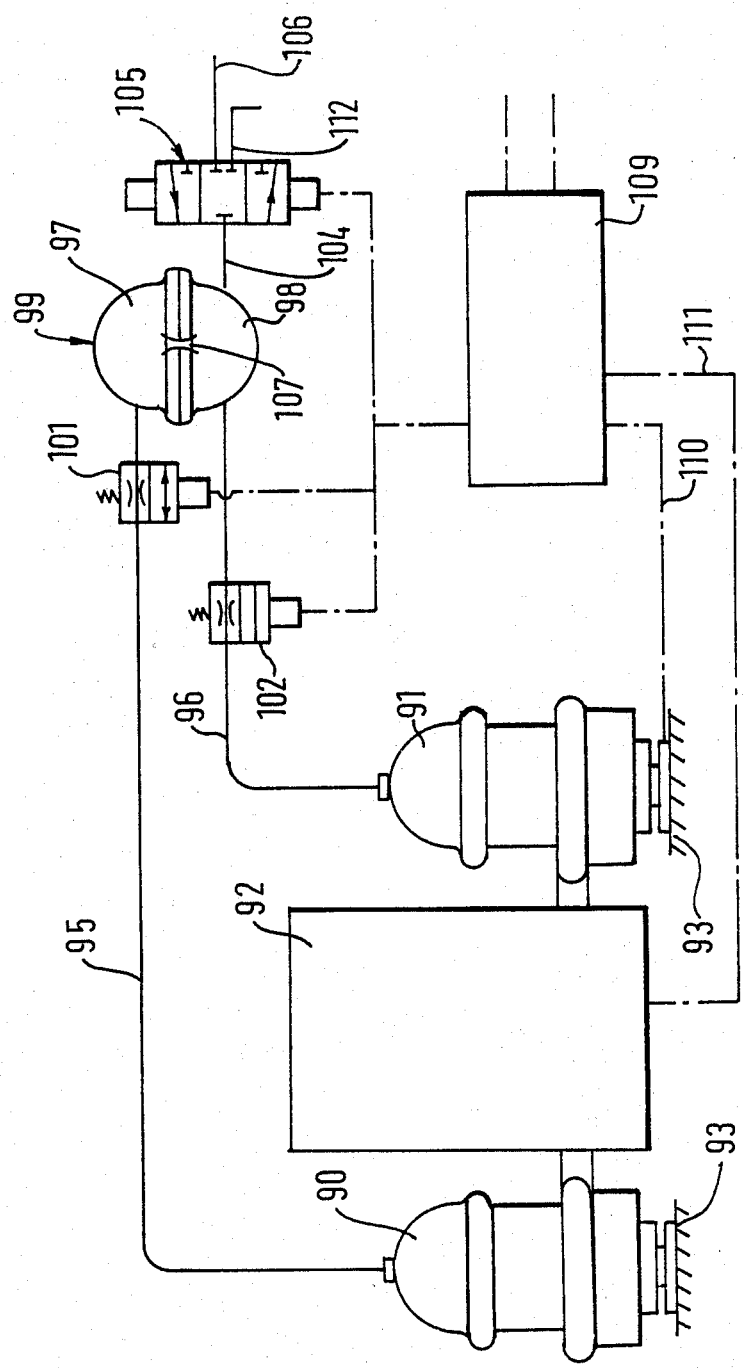

One embodiment of the invention will now be described, by way of example, with reference to the accompanying drawings in which:

FIG. 1 is a diagrammatic axial cross-sectional view of a vibration absorbing mounting in accordance with the invention, and FIG. 2 is a schematic view showing an operating system for a pair of mountings as shown in FIG. 1.

The vibration absorbing mounting 10 illustrated in FIG. 1 comprises a housing 11 formed from a series of four generally cup-shaped interengaging sheet metal componetns 12,13,14,15. The components 13 and 14 are sealed together by a circumferential fillet weld 16, providing an inwardly extending lip 17, and liquid-filled chambers 20 and 21 are partly bounded by the generally cylindrical structure thus formed. An inlet spigot 25 enables the chambers 20 and 21 to be filled, and a metal ring 26 is located in the housing portion 13 to support an intermediate rubber diaphragm 27 which is bonded to the ring 26 and is sufficiently thick to provide a spring action on deflection of the diaphragm 27 by a difference in pressures between the chambers 20 and 21. The ring 26 comprises a flange 30 having an aperture 31 to permit communication between the chamber 20 and an annular space 32 formed between the chamber 20 and an annular space 32 formed between the ring and the wall of the housing portion 13, and the ring 26 is locked in position by a small axial flange 33 which is peened into engagement beneath the lip 17. An opening 35 is provided in the lip 17 to permit communication between the annular passage 32 and the chamber 21, the flow of liquid between the chambers 20 and 21 thus being caused to circulate around substantially the whole periphery of the ring 26 in known manner to provide damping.

The chamber 20 is bounded on one side by a rubber separator diaphragm 40 which is sealingly secured between the housing portions 12 and 13 by a thickened bead portion 41 of the separator 40 which is held in an annular channel 42 and prevented from radially inward displacement by a rigid metal ring 43, the housing portions 12 and 13 being secured together by telescoping flange portions 44 and 45 respectively which are pressed together and secured by a turned over lip 46 on the flange position 44.

The housing portion 12 contains an air pressure chamber 47, a connection spigot 50 being provided to enable it to be connected to a source of compressed air through the system shown in FIG. 2 (to be described).

The liquid-filled chamber 21 is closed by an annular end diaphragm 55 having a bead 56 reinforced by a rigid metal bead wire 57 and trapped in a recess formed by a turned-in flange 58 formed in the housing portion 14. A ring 59 is provided within the bead 56 to assist in compressing the bead within the flange 58 so as to achieve a satisfactory seal. The diaphragm 55 also has an inner annular bead 65 which is seated in a corresponding recess 66 formed in a piston 67, a rigid metal ring 68 being provided to retain the diaphragm bead in position on the piston. The piston 67 is provided with a stem 70 having a reduced-diameter threaded portion 71 screwed into the piston, and a flange 72 is formed integrally with the stem 70.

The housing portion 15 extends around the piston 67 and stem 70 and is turned inwardly providing an end flange 75 on which is mounted an annular rubber buffer 76 which is thus rigidly attached to the housing and supported in an annular gap 78 formed between the outer face 79 of the piston and the flange 72. The buffer 76 thus provides control of the movement of the piston relative to the housing in the bump and rebound conditions to prevent excessive movement in either direction.

The end diaphragm 55 is of the rolling lobe type, incorporating a cord reinforcement for example of the kind illustrated in UK Patent Specification No. 969891. The side surface 81 of the piston 67 has a suitably curved profile for engagement with the diaphragm 55 to provide required stiffness/deflection characteristics, and the outer region of the diagraphm is arranged to contact a cylindrical metal shield 82 in its rolling action.

The rolling lobe diaphragm 55 has the effect of centering the piston 67 while permitting sufficient lateral compliance (at right angles to the axis of the mounting) to provide a sufficient degree of isolation of the chassis from lateral vibrations of the engine, excessive lateral movement of the engine being restrained by the buffer 76 encircling the stem 70.

FIG. 2 shows a pair of vibration absorbing mountings 90 and 91 in accordance with the invention arranged as part of a mounting system for an engine 92 on a chassis 93. Air pressure for the chambers 47 of the mountings 90 and 91 is supplied through pipes 95 and 96 respectively, pipes 95 and 96 being connected to separate chambers 97 and 98 respectively of a reservoir 99 via stiffness control valves 101, 102 respectively.

The reservoir 99 is connected by a pipe 104 to a height control valve 105 which is supplied with compressed air through a pipe 106 connected to a compressor (not shown), which may form part of the vehicle's normal equipment. The separate chambers of the reservoir 99 are connected through a restriction 107 which permits gradual equalization of the pressures in the two chambers.

An electronic control unit 109 is provided to receive signals from an engine height sensor through an input line 110 and from an engine speed sensor via an input line 111, and these signals actuate the control unit 109, when required to adjust the pressures and spring characteristics of the mountings 90 and 91, by means of the valves 101, 102 and 105 in the following manner.

The engine height control is effected by connecting the line 104 through the valve 105 either to the air supply line 106 or to an exhaust line 112. This permits air pressure in the respective air chambers 47 to be adjusted so as to bring the engine to the required height with the buffers 76 located centrally in the gaps 78 between the pistons of the mountings 90 and 91 and their associated mounting flanges.

In order to enable the spring stiffness of the mountings 90 and 91 to be adjusted, for example in accordance with engine speed so as to increase the stiffness at a predetermined engine speed, the control unit 109 is caused to operate the stiffness control valves 101 and 102 so as to close a relatively unrestricted passage and to insert a restriction in each of the connection lines 95 and 96 to the air chambers of the mountings 90 and 91. When the restrictions are in position, the effective volume of each air chamber 47, which in the open position of the valves 101 and 102 also comprises the volumes of the chambers 97 and 98 of the reservoir 99, is substantially reduced so far as transient changes are concerned; this increases the effective spring stiffness.

The vibration absorbing mounting described above provides improved isolation of the chassis from engine vibrations. Also, since the buffer 76 is effectively captive in the gap 78 between the piston 67 and the flange 72 the mounting is fail-safe, i.e. if the end diaphragm should fail in service the engine will always be held securely by the buffer 76 and the end flange 75.

The combination of the low rolling resistance of the reinforced rolling lobe of the end diaphragm, coupled with its high bulge stiffness, allows greater flexibility in the control of the design parameters of dynamic stiffness and damping achieved in combination with the intermediate diaphragm.

Having now described my invention, what I claim is:

1. A vibration absorbing mounting comprising a reinforced elastomeric rolling-lobe end diaphragm sealed to a housing and a piston engaging the central region of the end diaphragm, the housing comprising a pair of liquid-filled chambers which communicate with one another through a restricted passageway and which are separated from one another by an intermediate elastomeric diaphragm of sufficient thickness to provide substantial spring stiffness, a first chamber of said liquid-filled chambers being adjacent the end diaphragm, and a second of said liquid-filled chambers being bounded at one side by the said intermediate elastomeric diaphragm and at the other side by a separator diaphragm, the housing also comprising a gas chamber for containing gaseous pressure arranged to act on the side of the separator diaphragm remote from the second liquid-filled chamber.

2. A vibration absorbing mounting system for a vehicle engine comprising a vibration absorbing mounting according to claim 1 and means for controlling the height of the engine relative to the chassis by controlling the pressure of gas in the gas chamber.

3. A vibration absorbing mounting according to claim 1 wherein the piston is provided with a stem extending axially from the housing, the housing supporting an annular buffer of elastomeric material surrounding said stem and positioned in an annular gap between the piston and a flange on the stem.

4. A vibration absorbing mounting according to claim 1 wherein the intermediate elastomeric diaphragm is bonded to a metal ring which is located against an internal lip of the housing and locked in engagement therewith.

5. A vibration absorbing mounting according to claim 4 wherein the housing is formed from a series of generally cup-shaped interengaging sheet metal components, two of which are welded together to form the inwardly extending lip.

6. A vibration absorbing mounting comprising a reinforced elastomeric rolling-lobe end diaphragm sealed to a housing and a piston engaging the central region of the end diaphragm, the housing comprising a pair of liquid-filled chambers which communicate with one another through a restricted passageway and which are separated from one another by an intermediate elastomeric diaphragm of sufficient thickness to provide substantial spring stiffness, a first chamber of said liquid-filled chambers being adjacent the end diaphragm, and a second of said liquid-filled chambers being bounded at one side by the said intermediate elastomeric diaphragm and at the other side by a separator diaphragm, the housing also comprising a gas chamber for containing gaseous pressure arranged to act on the side of the separator diaphragm remote from the second liquid-filled chamber and a reservior connected to the gas chamber, means being provided for restricting the flow of gas between the reservoir and the gas chamber to increase the stiffness of the mounting.

* * * * *